US005145538A

United States Patent [19]

Yamaguchi

[11] Patent Number: 5,145,538

[45] Date of Patent: Sep. 8, 1992

[54] MANUFACTURING PROCESSES FOR INTEGRATED ARTICLE BEARING INDICIA

[75] Inventor: Takashi Yamaguchi, Fujisawa, Japan

[73] Assignee: Kabushiki Kaisha Sebun Shiizu, Fujisawa, Japan

[21] Appl. No.: 714,366

[22] Filed: Jun. 12, 1991

Related U.S. Application Data

[60] Continuation of Ser. No. 352,586, May 16, 1989, abandoned, which is a division of Ser. No. 228,782, Aug. 4, 1988, abandoned, which is a continuation of Ser. No. 850,187, Apr. 10, 1986, abandoned.

[51] Int. Cl.$^5$ .............................................. B32B 31/00

[52] U.S. Cl. ........................................ 156/69; 156/87; 156/286; 156/242; 264/102; 264/261; 40/616; 40/630

[58] Field of Search ................. 156/382, 104, 242, 69, 156/87, 244.12, 286, 79; 141/7, 59, 65, 66; 264/299, 102, 261, 132; 425/812; 40/630, 626, 615, 616

[56] References Cited

U.S. PATENT DOCUMENTS

| | | | |
|---|---|---|---|
| 1,732,822 | 10/1929 | Wehr et al. . | |
| 2,036,146 | 3/1936 | Kampfer . | |
| 2,073,844 | 3/1937 | Lowenfels . | |
| 2,268,258 | 12/1941 | Lytle . | |
| 2,359,131 | 9/1944 | Lytle . | |
| 2,588,604 | 3/1952 | Archer | 156/69 |
| 2,903,389 | 9/1959 | Fujita | 264/102 |
| 2,932,913 | 4/1960 | Hannon . | |
| 2,994,150 | 8/1961 | Navarre . | |
| 3,312,197 | 4/1967 | Smith . | |
| 3,498,626 | 3/1970 | Sullivan | 156/286 |
| 3,680,225 | 8/1972 | Ishida . | |
| 3,800,449 | 4/1974 | Minatodani et al. | 40/630 |
| 3,874,979 | 4/1975 | Hannon . | |
| 3,956,050 | 5/1976 | Dow et al. | 156/242 |
| 4,057,921 | 11/1977 | Ball . | |
| 4,064,919 | 12/1977 | Stern et al. | 141/7 |
| 4,082,426 | 4/1978 | Brown . | |
| 4,145,465 | 3/1979 | Sanderson et al. | 40/630 X |
| 4,183,554 | 1/1980 | Howard, Jr. . | |
| 4,481,160 | 11/1984 | Bree | 264/135 |
| 4,500,573 | 2/1985 | Piaggi . | |
| 4,648,189 | 3/1987 | Michel . | |
| 4,698,935 | 10/1987 | Cronenweit et al. | 47/57.5 |
| 4,724,023 | 2/1988 | Marriott | 156/382 X |
| 4,746,392 | 5/1988 | Hoppe | 156/244.12 |
| 4,823,489 | 4/1989 | Cea | 40/615 X |

FOREIGN PATENT DOCUMENTS

| | | |
|---|---|---|
| 1223679 | 8/1966 | Fed. Rep. of Germany . |
| 60-154100 | 8/1985 | Japan . |
| 60-149500 | 8/1988 | Japan . |
| 1375195 | 11/1974 | United Kingdom . |

OTHER PUBLICATIONS

Halkh's Chemical Dictionary, 4th Edition, McGraw-Hill, p. 293.

Encyclopedia of Polymer Science & Technology, "Embedding", vol. 5, pp. 747-761.

Shin-Etsu Silicone KE-1052 Product Brochure.

"Shin-Etsu Silicone Two Component RTV Silicone Gel for Potting KE-1052", by Shin-Etsu Chemical Co., Ltd.

*Primary Examiner*—David A. Simmons
*Assistant Examiner*—Chester T. Barry
*Attorney, Agent, or Firm*—Armstrong & Kubovcik

[57] ABSTRACT

A hard enclosing container which is transparent at least at its front wall, has a metallic plate bearing indicia contained therein. An enclosing layer of a viscous adhesive agent is stuck to all surfaces of the plate and fills the container. The layer includes at least a front covering layer which is transparent. To form the article, the plate is adhered to a bottom wall of the container by a lower covering layer of the adhesive agent or by a pressure sensitive adhesive double coated sheet. Viscous adhesive agent is charged to the container. The container is then sealed by a transparent hard top cover. Alternatively, the container with the plate stuck therein can be closed by the transparent hard top cover and the adhesive agent is then charged into the sealed container expelling any air trapped therein. The sealed container can be evacuated prior to charging.

6 Claims, 2 Drawing Sheets

MANUFACTURING PROCESSES FOR INTEGRATED ARTICLE BEARING INDICIA

This application is a continuation of application Ser. No. 352,586 filed May 16, 1989 which is divisional application of Ser. No. 228,782 filed Aug. 4, 1988 which is a continuation of Ser. No. 850,187 filed Apr. 10, 1986 all abandoned.

BACKGROUND OF THE INVENTION

This invention relates to an integrated article bearing indicia and, more specifically, to an integrated article including a metallic plate having thereon indicia such as letters, figures, a patterns or the like which is integrally covered with a transparent hard material, and a manufacturing process thereof.

A metallic plate having thereon any desired indicia of letters, figures, patterns or the like, applied by printing, embossing or the like has been hitherto used for a number plate for a motorcar, an advertising indication plate or the like. Such a plate is usually comparatively small in thickness, so that it is liable to be bent in use.

From the viewpoint of increasing an ornamental effect of such an article, it can be considered to form by an insertion molding or the like two covering molded plates of transparent hard synthetic resin such as silicon resin, acrylic resin or the like which are then integrally fixed to both surfaces of the metallic plate bearing the indicia.

This integrated article, however, is defective in that when it is subjected to a temperature change (−40° C.–+80° C.) in a natural environment, due to the fact that there is a remarkable difference in thermal expansion coefficient between the internal metallic plate and the hard synthetic resin molded plate or plates combined integrally therewith, and that each synthetic resin molded plate is a hard one, a peel-off can occur between the two, and the hard synthetic resin molded plate can crack as a result of repeated expansion and contraction of two.

The thermal expansion coefficients of various kinds of materials may be compared as listed below:

| | |
|---|---|
| Iron | $0.11 \times 10^{-4}$ |
| Steel | $0.17 \times 10^{-4}$ |
| Aluminum | $0.23 \times 10^{-4}$ |
| Polycarbonate resin | $0.6–0.7 \times 10^{-4}$ |
| Acrylic resin | $0.7–0.8 \times 10^{-4}$ |
| ABS resin | $0.8 \times 10^{-4}$ |

OBJECT AND SUMMARY OF THE INVENTION

This invention has for its object to provide an integrated article bearing indicia which is free from the foregoing defects and is stable and durable.

The invention is characterized in that a hard enclosing container which is transparent at least at its front wall is prepared, and a metallic plate bearing the indicia is contained in and stuck to the container, through an enclosing layer of misco-elastic gel which is used as a viscous adhesive agent which is applied to all surfaces of the metallic plate and of which at least a front layer is transparent.

BRIEF DESCRIPTION OF THE DRAWINGS

The above and other objects and the attendant advantages of the present invention will become readily apparent by reference to the following detailed drawings when considered in conjunction with the accompanied drawings wherein:

FIGS. 4–6 show one example of a manufacturing process according to this invention wherein:

FIG. 4 is a sectional view of an article at the stage that an indicating metallic plate is contained and fixed, FIG. 5 is an enlarged sectional view of a part thereof, and FIG. 6 is a sectional view of the final article thereof.

DETAILED DESCRIPTION OF PREFERRED EMBODIMENTS

Figure 1:
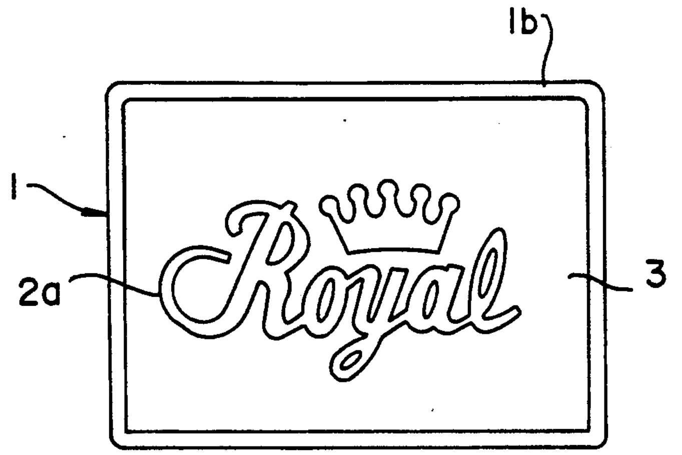
FIG. 1 is a top plan view of one embodiment of this invention.
Figure 2:
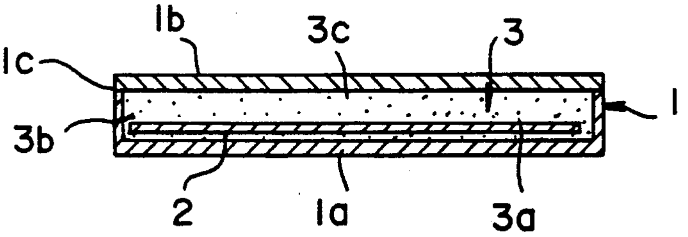
FIG. 2 is a sectional view thereof.

Embodying examples of this invention will now be explained with reference to the accompanying drawings:

Referring to FIGS. 1 and 2 showing one embodiment of this invention, a hard enclosing container 1 comprises a lower container **1*a* and an upper cover member 1*b*. The lower container 1*a* and the upper cover member 1*b* are formed by being molded out of a transparent hard synthetic resin such as acrylic resin, polycarbonate resin or the like. Mutual abuttment portions of the lower container 1*a*, and the upper cover member 1*b* are airtightly together joined at 1*c* through a desired sealing means such as by applying an adhesive agent or a thermal fusion process. An aluminium metallic plate 2 bearing a desired indicia 2*a* of letters, figures or the like applied by means of printing, painting, coloring, etching, embossing or the like is contained in and stuck to the enclosing container 1, through an enclosing layer of transparent viscous adhesive agent 3 (i.e., visco-elastic gel) interposed between the entire metallic plate 2 and the enclosing container 1. That is, the adhesive agent 3 completely surrounds the metallic plate 2 in the container 1**. Thus, there is formed an integrated article bearing indicia.

The lower container **1*a* may be opaque. The adhesive agent enclosing layer 3 comprises a lower covering layer 3*a* interposed between a lower surface of the metallic plate 2 and an inner bottom surface of the lower container 1*a*, a circumferential side covering layer 3*b* interposed between a circumferential side surface of the metallic plate 2 and a circumferential side surface of the lower container 1*a*, and an upper covering layer 3*c* interposed between an upper surface of the metallic plate 2 and a lower surface of the upper cover member 1*b*. When the lower container 1*a* is made of an opaque material, a transparent adhesive agent is used only for the upper covering layer 3*c*, and the other layers 3*a*, 3*b*** , may be formed out of an opaque vicious adhesive agent (i.e., opaque visco-elastic gel).

This integrated article of this invention is such that the indicia **2*a* on the indicating metallic plate 2 can be viewed from the front through the transparent cover member 1*b* and the transparent upper adhesive agent covering layer 3*c*. Thus, the article can be suitably used as an ornamental indicative plate. Even if the article is subjected to large changes in temperature during its use, and the metallic indicative plate 2 is repeatedly expanded and contracted, the hard synthetic resin enclosing container can be prevented from cracking, and at the same time the metallic plate 2 can be prevented, by the visco-elasticity of the adhesive agent (i.e., the visco-elastic gel), from being peeled off from its predetermined position, and can be kept in its stable stuck condition because there is interposed a soft material of the enclosing layer of viscous adhesive agent 3 between the plate 2 and the enclosing container 1**.

Additionally, a space between the metallic plates 2 and the enclosing container 1 is filled with the enclosing viscous adhesive agent 3 so that no air gap may remain in the space. Consequently, a fear that any peel-off of the sealed portion 1*c* might be caused by a thermal expansion of air is completely eliminated. Thus there can be provided a stable and durable integrated article bearing indicia.

As for the foregoing adhesive agent, any desired one of various kinds of known adhesive agents can be used. It is especially preferable to use an agent which is initially in a liquid state and is thereafter changed into one in a viscous gel while it is being kept at a room temperature or being heated to a desired temperature. For instance, a room temperature setting silicone viscous agent of a two component system of A and B liquids called "Shin-Etsu Silicone KE 1052 A & B" made by Shin-Etsu Chemical Co. Ltd. or "CX 52-267 A/B" Silicone viscous agent of a combination of a liquid transparent silicone resin called "CX 52-267A" and a liquid cross-linking agent called "CX 52-267B" made by Toray Silicon Co. Ltd. is suitable. At the time of use of each of these, equal amounts of the liquid A and the liquid B are mixed together, and the resultant mixture is charged into the lower container 1*a* with the metallic plate 2 therein and thereafter is covered with the cover member 1*b*, so that the same can be set by being allowed to stand at a room temperature or being heated to a predetermined temperature to form a viscous adhesive agent enclosing layer 3 in a gel state (i.e., viscous-elastic). Thus, in this case, the space between the metallic plate 2 and the lower container 1*a* can be filled with the agent in a liquid condition thereof, so that an operation for filling the space with the adhesive agent without any gap and enclosing of the metallic plate can be carried out at a good working efficiency, and there can be obtained a product of good quality. In addition, because there is an air layer between the cover member and the metallic plate, no undesirable reflection occurs, so that the appearance of the product is improved in transparency or clearness, and accordingly, visibility of the indicia 2*a*.

The foregoing two component type adhesive agent, "KE 105AB", for instances, is colorless and highly transparent, and in the case where the mixing ratio of the A and B liquids is 1:1, a penetration value is 90 in 24 hours after beginning of the setting thereof.

Such a modification can be considered that, through not illustrated, the transparent cover member 1*b* is formed, at its front surface, as a curved surface such as a convex lens or a concave lens, so as to produce a lens effect.

Figure 3:
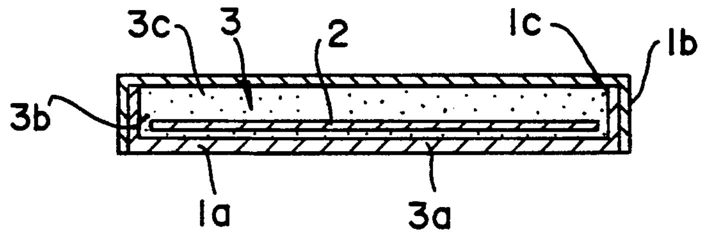
FIG. 3 is a sectional view of a modified embodiment thereof.

FIG. 3 shows a second embodiment wherein the lower container and the cover member are by an insertion molding by means of an injection molding machine. The transparent cover member 1*b* is formed as a box shaped-member that covers and protects integrally the circumferential side surfaces of the lower container wall 1*a* and is jointed at 1*c* hermetically thereto by a thermal fusion thereof.

One example of a manufacturing process of the foregoing integrated article bearing indicia of this invention will be explained as follows:

An adhesive agent in a liquid form is charged into the lower container 1*a* so as to form the lower covering layer 3*a* of a desired thickness on the inner bottom surface thereof. The metallic plate 2 bearing the desired indicia is placed on the upper surface of the lower covering layer 3*a*., The space surrounding the outer circumferential side surfaces and the upper surface of the metallic plate 2 is then charged with further adhesive agent in a liquid form so as to be fully filled therewith to the upper end of the circumferential edge of the lower container 1*a*. Thereafter the transparent cover member 1*b* is applied to the upper surface thereof and the circumferential edge portion thereof is jointed air-tightly to the upper circumferential edge of the lower container 1*a* .

As for the further rapid manufacturing process, instead of the foregoing manufacturing process, the article can be manufactured by using a pressure sensitive double coated adhesive sheet member, as described below.

Figure 4:
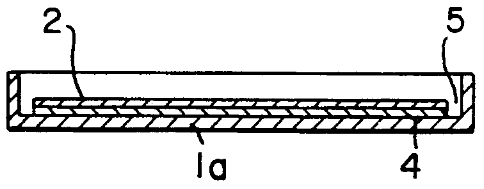
Figure 5:
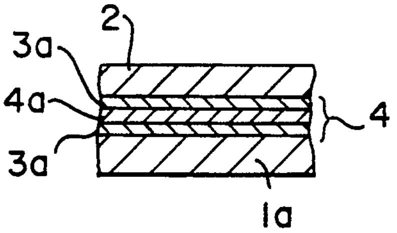

One example thereof will be explained with reference to FIGS. 4–6 as follows:

The lower container 1*a* made of opaque hard synthetic resin is prepared as shown in FIG. 4, and any desired pressure sensitive double coated adhesive agent sheet member 4 is adhered, at a surface of an adhesive coated layer 3*a* (that is, a lower covering layer 3*a* on FIGS. 2 and 3) lying on a lower surface of a base sheet member 4*a* thereof, to the inner bottom surface of the container 1*a*. A predetermined indicative metallic plate 2 is stuck to a surface of an adhesive coated layer 3*a* (that is, a lower covering layer 3*a* on FIGS. 2 and 3) lying on an upper surface of the base member 4*a* leaving a slight gap 5 between the plate 2 and the sheet member 4 and the circumferential inside side surface of the lower container 1*a* .

Thereafter, the foregoing transparent setting or gelatinizing adhesive agent of the two liquid components is charged to fill the foregoing gap 5 and in addition a space on the upper surface of the metallic plate 2 so that a proper thickness of the adhesive agent is formed. Then the transparent cover member 1*b* applied to the upper surface thereof so that it adheres to the upper surface of the charged adhesive agent. The mutual abuttment portions of the cover member 1*b* and the upper peripheral edge of the lower container wall 1*a* are jointed at 1*c* air-tightly, by applying to the joint portion 1*c* an adhesive agent, high frequency heating, ultrasonic vibration heating, or any desired sealing means.

Figure 6:
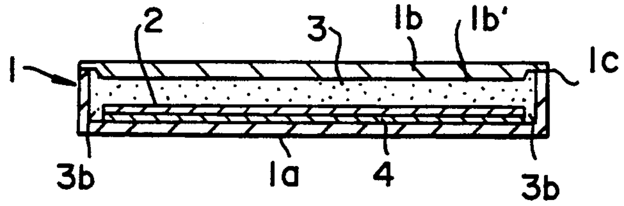

During this operation, with the lapse of time, the adhesive agent is set to turn into a viscous adhesive gel in about 24 hours, whereby the article can be produced rapidly and simply having the container 1 filled with the viscous adhesive agent enclosing layer comprising the lower covering layer 3*a*, the circumferential side covering layer 3*b* and the upper covering layer 3*c* which are stuck to all of the inner surfaces of the enclosing container 1 and the circumferential surface of the metallic plate 2 (FIG. 6).

If the cover member 1*b* is provided at its lower portion with an engaging projection 1*b*′ projecting into engagement with the adhesive agent layer 3, close contact between the two can be improved.

The foregoing metallic plate 2 is not limited to one made of aluminium, and may be replaced with a metallic plate made of any desired metal such as copper, brass, stainless steel, iron or the like. In addition, such a modification can be considered that any desired filling member such as of synthetic resin or other kind is interposed between the upper surface of the adhesive agent enclosing layer 3 and the cover member 1b.

It is a matter of course that, when the indicative metallic plate has indications on both surfaces thereof, the adhesive agent on the reverse surface side thereof and the lower container should be formed of transparent material.

Figure 7:
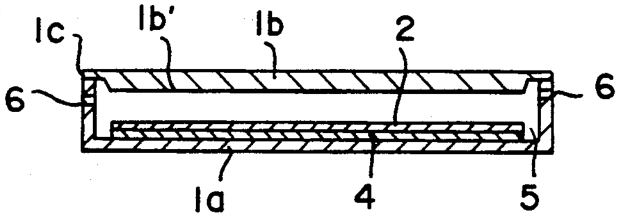
FIGS. 7–9 shows modified examples of the inventive manufacturing process.
Figure 8:
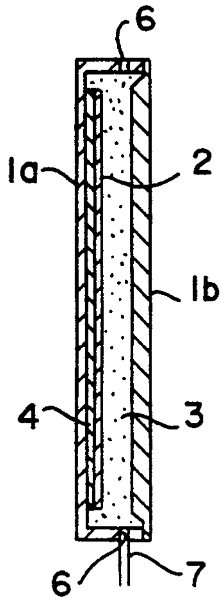

In order to reliably obtain an article of this invention wherein even a very minor amount of air does not remain in the hard enclosing container 1 and the adhesive agent is filled in the container in a good close contact without any gap, it is preferable to manufacture a product by the following process:

FIGS. 7 and 8 show one embodiment thereof. In this example, the lower container 1a is previously provided with small openings 6, 6 made in the opposite side walls thereof. The pressure sensitive double coated adhesive sheet member 4 is adhered to the inner bottom surface of this container 1a. The indicating metallic plate 2 is stuck to the surface of the upper adhesive layer 3a of the adhesive sheet member 4. Thereafter, the cover member 1b is applied thereto and the circumferential edge thereof is air-tightly jointed at 1c to the circumferential upper edge of the lower container 1a by means of the adhesive agent or thermal fusion therebetween so as to form the hard enclosing container 1.

Thereafter, as show in FIG. 8, this enclosing container 1 is held vertically with the small openings 6, 6 positioned above and below. The adhesive agent 3 is charged through a charging tube 7 into the lower small opening 6 serving as the charging opening. During this operation, the air in the container 1 is discharged or expelled from the upper small opening 6 in accordance with the charging of the adhesive agent from below. Charging is carried out until when the internal space is fully filled with the adhesive agent 3. If, in this case, the gelatinating adhesive agent as mentioned before is charged, the same can be gelatinized after being charged, so that, even when the charging tube 7 is removed, the internal adhesive agent does not flow out and the interior of the container 1 remain in a good charged condition.

If these small openings 6, 6 do not spoil the appearance of the visual product, they may be left as they are, because the internal adhesive agent in gel state does not flow out therethrough and there is no problem in function thereof. However, if desired, the openings 6, 6 may be closed with a desired sealing agent such as thermosetting resin, though not illustrated.

Thus, there can be obtained an integrated article having the enclosing layer of viscous adhesive agent filled therein which is in its good close contact condition without any air remaining therein.

Figure 9:
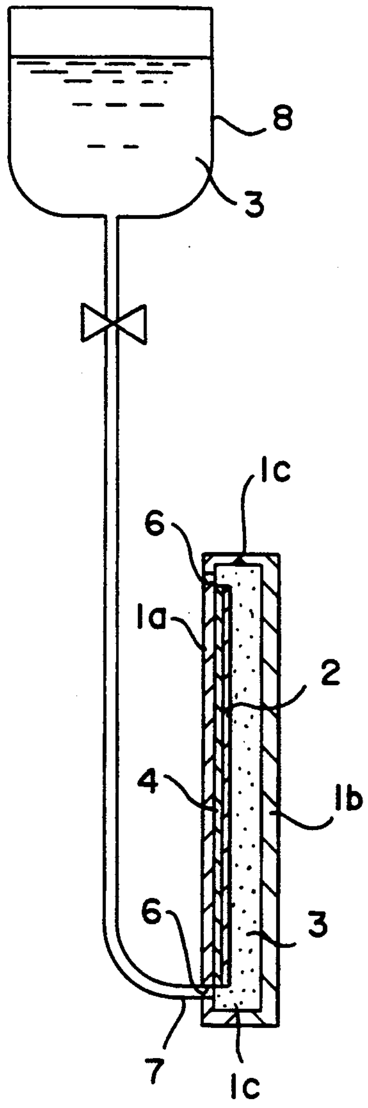

FIG. 9 shows another embodiment of this inventive process. In this case, the small openings 6, 6 are made in the bottom wall of the lower container 1a of the enclosing container 1. The enclosing container 1 is placed in a vacuum chamber (not shown), and the charging tube 7 is, at its one end, connected to the lower small opening 6 of the enclosing container 1 contained in the vacuum chamber, and is, at its other end, connected to a supply container 8 for supplying the foregoing two component mixture of adhesive agent in a liquid condition 3, located outside the vacuum chamber. Under this condition, the vacuum chamber is subjected to a vacuum and air remaining in the space of the enclosing container 1 is evacuated. Under the vacuum condition, the adhesive agent 3 is charged into the enclosing container 1 through the charging tube 7, so that there is no fear of entraining air in the adhesive agent which is being charged in the container 1 and a good product including no air can be assured.

In addition, this product has a better appearance because the small openings 6, 6 cannot be viewed from the front.

Thus, according to this invention, an indicative metallic plate is contained, in an enclosing layer of viscous adhesive agent in a hard enclosing container which is transparent at least at its front surface, so that the resultant integrated article bearing indicia is advantageous in that the hard enclosing container thereof is prevented from cracking by repeated expansion and contraction of the metallic plate caused by changes in temperature.

If the manufacturing process thereof is carried out by adhering the indicative metallic plate to the inner bottom surface of the lower container through the use of the adhesive agent layer formed by charging, there can be formed a desired thickness of such a lower covering layer that is comparatively large in thickness and is capable of absorbing a shock or impact very well. If the manufacturing process is carried out by adhering the metallic plate through the use of a pressure sensitive double coated adhesive sheet member to the inner bottom surface of the lower container, the adhering operation of the metallic plate can be carried out rapidly. If the manufacturing process is carried out by forming the enclosing container containing the indicative metallic plate in advance, and thereafter the adhesive agent is charged thereinto, the internal air can be discharged by the adhesive agent which is being charged. In this manner an integrated article bearing indicia can be assuredly obtained filled with the covering adhesive agent layer in good close contact condition with the enclosing container.

If the charging of adhesive agent into the enclosure container is carried out under vacuum, the product fully charged with the adhesive agent without containing air at all can be assuredly obtained.

It is readily apparent that the above-described integrated article bearing indicia and manufacturing processes therefor meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A manufacturing process of an integrated article bearing indicia comprising the steps of:

forming a lower container with two small openings in opposite side walls thereof;

adhering a pressure sensitive adhesive double coated sheet member to an inner bottom surface of said lower container;

adhering a metallic plate bearing the indicia to an upper surface of the pressure sensitive adhesive coated sheet member leaving a circumferential space between the metallic plate and a circumferential side wall of the lower container;

joining a transparent hard cover member to the lower container air-tightly to form a sealed enclosure container;

vertically arranging said sealed enclosure container such that the side walls containing the small openings are positioned one above the other;

charging a two-component system liquid agent through a charging tube into the sealed enclosure container, to fill the circumferential space and covering the upper surface of the metallic plate, from one of said small openings made in one of the side walls of the sealed enclosure container located at a lower position while discharging any internal air from the other of said small openings made in the opposite side wall of the sealed enclosure container located at an upper position so that any space in the enclosure container may be filled with the two component system liquid agent; and forming the liquid agent into a transparent visco-elastic gel covering the upper surface of the metallic plate and surrounding the circumferential side thereof.

2. A manufacturing process as claimed in claim 1, wherein the visco-elastic gel is a silicon resin which is transparent.

3. A manufacturing process according to claim 1 further comprising the step of sealing said small openings with a sealing agent.

4. A manufacturing process of an integrated article bearing indicia comprising the steps of:

forming a lower container with two small openings formed in a bottom surface thereof;

adhering a pressure sensitive adhesive double coated sheet member to an inner bottom surface between said small openings of said lower container;

adhering a metallic plate bearing the indicia to an upper surface of the pressure sensitive adhesive coated sheet member leaving a space between the metallic plate and a circumferential side wall of the lower container;

joining a transparent hard cover member to the lower container air-tightly to form a sealed enclosure container;

arranging said sealed enclosure container in a vacuum device such that said bottom surface is vertically arranged and said small openings are positioned one above the other;

charging a two component system liquid agent through a charging tube into the sealed enclosure container, to fill the space and covering an upper surface of the metallic plate, from said small opening made in the enclosure container which is at a lower position while evacuating any internal air from said small opening which is located in an upper position of the enclosure container by said vacuum device so that any space in the enclosure container may be filled with the two component system liquid agent; and forming the liquid agent into a transparent visco-elastic gel covering the upper surface of the metallic plate and surrounding the circumferential side thereof.

5. A manufacturing process as claimed in claim 4, wherein the visco-elastic gel is a silicon resin which is transparent.

6. A manufacturing process according to claim 4 further comprising the step of sealing said small openings with a thermosetting resin.

* * * * *